June 14, 1938.  D. PAUL  2,120,866
FUEL CONTROLLING DEVICE
Filed June 5, 1937
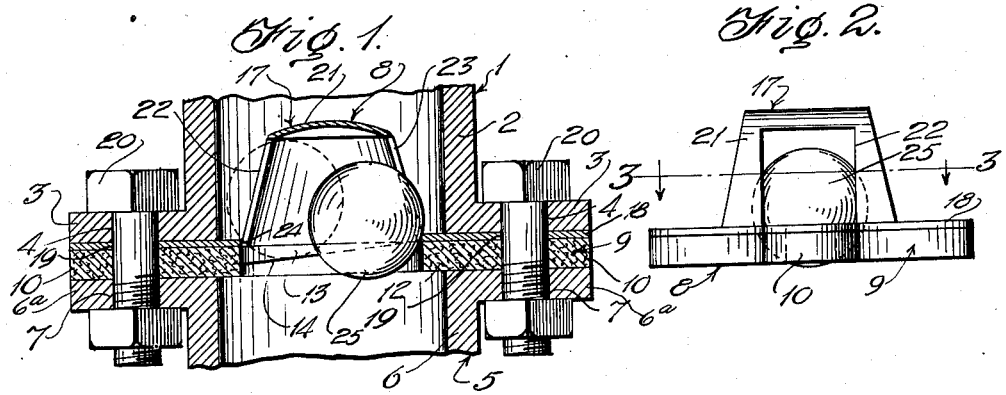
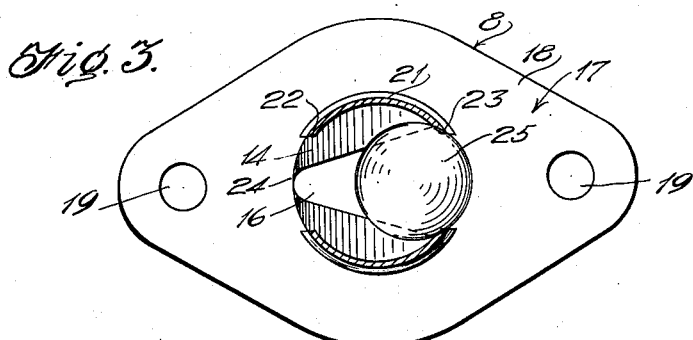
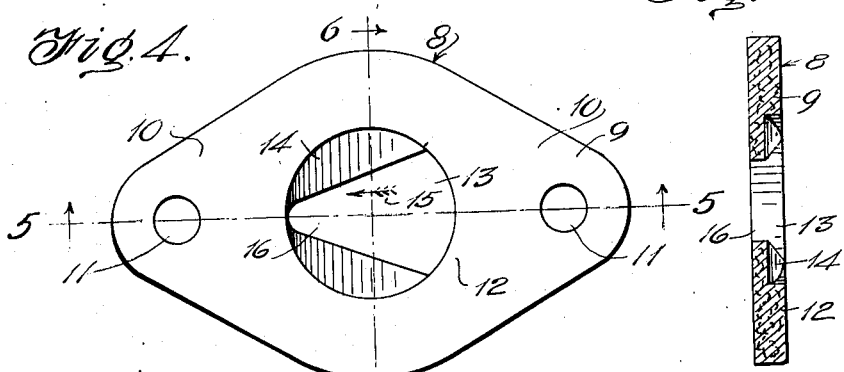
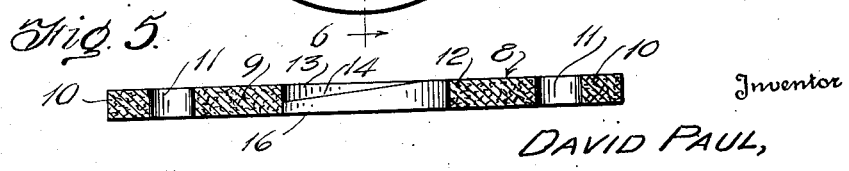
Inventor
DAVID PAUL,
By Kimmel & Crowell,
Attorneys.

Patented June 14, 1938

2,120,866

UNITED STATES PATENT OFFICE 2,120,866

FUEL CONTROLLING DEVICE

David Paul, Brooklyn, N. Y.

Application June 5, 1937, Serial No. 146,667

7 Claims. (Cl. 137—152)

This invention relates to a fuel controlling device designed primarily for use in connection with internal combustion engines of automotive vehicles, but it is to be understood that the device, in accordance with this invention, is to be employed in any connection for which it may be found applicable.

The invention has for its object to provide, in a manner as hereinafter set forth, a device of the class referred to for interposition between the carburetor and intake manifold of the engine for creating a better and more thorough fuel mixture which results to lessen the consumption of the fuel through the more effective use of what is consumed, or in other words, fuel is saved because the possibility of waste is lessened.

This objection is overcome by the device in accordance with this invention and therefore such device is so constructed and arranged as to act as a governor to partially shut off the fuel supply or mixture from the carburetor and automatically governs the same in direct ratio to the speed of the engine, preventing choking, etc.

A further object of the invention is to provide, in a manner as hereinafter set forth, a fuel controlling device for interposition between the carbureter and intake manifold of the engine and with the device including a shiftable element so arranged and of such contour to be impacted or contacted by the fuel on the passage of the latter through the device to impart a turbulent or swirly action to said element to create a better and more thorough mixture resulting in the lessening of the consumption of the fuel through the more effective use of what is consumed; to break up the fuel and air particles in the stream, to the intake of the engine into small particles; and to provide a drier and thus more readily explosive mixture whereby fuel is saved because the possibility of waste is lessened.

Further objects of the invention are to provide, in a manner as hereinafter set forth, a fuel controlling device which is simple in its construction and arrangement, strong, durable, compact, readily installed between the carburetor and intake manifold of an engine, thoroughly efficient in its use and comparatively inexpensive to manufacture.

To the above ends essentially and to others which may hereinafter appear, the invention consists of the novel construction, combination and arrangement of parts as will be more specifically referred to and as illustrated in the accompanying drawing wherein is shown an embodiment of the invention, but it is to be understood that changes, variations, and modifications may be resorted to which fall within the scope of the invention as claimed.

In the drawing:

Figure 1 is a longitudinal view of the device installed between the intake terminal portion of the intake manifold of the engine and the outlet terminal portion of the carbureter, Figure 2 is a side elevation of the device, Figure 3 is a section on line 3—3, Figure 2, Figure 4 is a top plan view of the base member of the device, Figure 5 is a section on line 5—5, Figure 4, and Figure 6 is a section on line 6—6, Figure 4.

The device is shown by way of example as installed between an up-draft carbureter and the intake manifold of the engine, but it is to be understood that the device may be employed in connection with a down-draft carbureter and the intake manifold of the engine.

With reference to the drawing, the intake terminal portion of the intake manifold 1 of an engine is indicated at 2 and the lower end of portion 2 is formed with a pair of oppositely disposed laterally extending flanges 3 provided with openngs 4. The outlet terminal portion of an updraft carbureter 5 is indicated at 6 and is formed at its lower end with oppositely disposed laterally extending flanges 6ª provided with openings 7. Flanges 3 and 6ª are of the same form and the openings 4 in the flanges 3 align with the openings 7 in the flanges 6ª.

The device generally indicated at 8 is to be interpositioned between the aligned ends of the elements 1, 5 and anchored thereto in a manner to be referred to. The device 8 consists of a base plate 9 formed of any suitable material, preferably fibrous, such as asbestos. The shape of plate 9 corresponds in shape to that of the shape of the flanged ends of the elements 1, 5. Oppositely disposed portions of plate 9, which are indicated at 10, constitute flanges formed with openings 11. The plate 9 is to be positioned on the upper face of the flanges 6ª and the openings 11 in plate 9 register with the openings 7 in flanges 6ª. The central portion 12 of plate 9 is formed with a circular recess 13 having its base or bottom 14 inclining downwardly from one side to the other of the recess in the direction of the arrow 15, that is to say, bottom 14 is inclined to the horizontal. The bottom 14 of recess 13 is formed with a V-shape opening 16 which is oppositely disposed with respect to the direction of the arrow 15.

The device includes a valve cage forming element 17, preferably constructed of metallic material and including a base 18 of the same size and outline as the plate 9. The base 18 is seated upon the base plate 9 and is formed with openings 19 which register with the openings 4 and 11. Extending through the registering openings are holdfast means 20 for detachably clamping the intake manifold 1, carbureter 5 and device 8 together. The base plate 9 is of greater thickness than the base 18 of the element 17. The element 17 includes a valve cage 21 closed at its top and having the major portion of opposed sides thereof cut out and indicated at 22, 23. The cage 21 is open at its bottom. The cutouts 22, 23 are diametrically opposed and of like area. The base 18 centrally thereof is formed with a circular opening 24 corresponding in diameter to that of the recess 13. The lower end of the body of the cage is integral with and has its inner faces of its sides form spaced continuations of the edge of the opening 24. Cage 21 is of substantially frusto-conoidal contour.

Within the cage 21 is loosely arranged a globular valve element 25 which is slidably mounted on the inclined bottom 14 of the recess 13. The bottom 14 constitutes a seat for element 25.

The opening 16 at its larger end is of a width to permit of a part of element 25 to extend therethrough. The openings provided by the cutouts 22, 23 are of a width to permit of the passing therethrough of a part of element 25.

When the device is installed, relative to the intake manifold and carburetor, the cage 21 is disposed in the intake manifold and the diameter of the cage is such as to be spaced from the inner face of the manifold. When the element 17 and base plate 9 are clamped together, the opening 24 registers with the recess 13. The opening 16 and cutouts 22, 23 provide means for establishing communication between the intake manifold and the carbureter and constitute an intake for the fuel to the intake manifold. The passage of the fuel through the device imparts a turbulent or swirly action to the element 25.

The normal position of the device will be as shown in Figure 1 with element 25 in full lines and when fuel for the carbureter is discharged therefrom, it passes through a non-closed portion of opening 16 and also acts to revolve element 15 and shift it to the dotted line position shown in Figure 1. When the device is active the element 25 will have a turbulent or swirly action which is caused by the passage of the fuel through the device.

The device lessens the consumption of fuel through the more effective use of what is consumed because a better and more thorough mixture is created due to the turbulent and swirly action on element 25 caused by the passage of the mixture through the device. The contact of the mixture with element 25 tends to break up the fuel and air particles in the stream to the intake of the engine, into small molecules. The contact also tends to a drier and thus more readily explosive mixture. Owing to the creating of a better mixture, fuel is saved because of the possibility of waste is lessened.

The device also serves as a governor to partially shut off the fuel supply or mixture as it passes from the carbureter and automatically governs the same in direct ratio to the speed of the engine preventing choking, etc.

The openings 22, 23 are disposed at the opposite ends of the V-shape opening or slot 16. When the element 25 moves towards the opening 22 it rises by reason of the convergence of the sides of the opening or slot 16. The shifting or rolling of element 25 in opposite directions varies the supply of fuel through opening 16.

What I claim is:

1. A fuel controlling device adapted to be interposed between the intake manifold and the carbureter of an internal combustion engine, said device including means to provide a valve seat, said seat being inclined to the horizontal, said means being formed with a V-shape opening extending through said seat, a cage anchored to said means and open at its bottom for communication with said opening, said cage having its body formed with diametrically opposed openings, and a globular valve element within the cage and having rolling contact with said seat.

2. A fuel controlling device adapted to be interpositioned between the intake manifold and the carbureter of an internal combustion engine, said device including means to provide a valve seat, said seat being inclined to the horizontal, said means being formed with a V-shape opening extending through said seat, a cage anchored to said means and open at its bottom for communication with said opening, said cage having its body formed with diametrically opposed openings, and a globular valve element within said cage and having rolling contact with said seat, said element capable when rolling in one direction to extend in one of the openings in said cage and into the wider end of the V-shape opening and when rolling in the other direction having a part extend through the other opening in said cage.

3. In a fuel controlling device for interpositioning in the path of a fuel mixture travelling from the carbureter to the intake manifold of an internal combustion engine, said device including a base plate formed in one face with a recess having a bottom inclined to the horizontal, said base plate being formed with a V-shape opening extending through said bottom, an element mounted against said face of said base formed with an opening registering with said recess and further formed with a cage extended from the wall of said opening and provided in its body with diametrically disposed openings, and a globular element mounted on said bottom for rolling contact therewith to enter when travelling in one direction one of the openings in said cage and in said V-shape opening and when travelling in the other direction into the other opening in said cage, said element having a turbulent or swirly action imparted thereto by the fuel travelling through said device towards the engine.

4. A fuel controlling device for interpositioning in the path of travel of combustible fuel from a carbureter into the intake manifold of an internal combustion engine, said device including a base formed with a recess having its bottom inclined to the horizontal and an opening extending through said bottom for the passage of the combustible fuel, a globular element positioned for rolling engagement with said bottom and having imparted thereto by the fuel passing through said opening a turbulent or swirl action, and a cage confining the limits of the rolling of said element in opposite directions, said cage being connected with said base and having its lower end opening into said recess.

5. A fuel controlling device for interpositioning in the path of travel of combustible fuel from a carburetor into the intake manifold of an internal combustion engine, said device including a base formed with a recess having its bottom inclined to the horizontal and an opening extending through said bottom for the passage of the combustible fuel, a globular element positioned for rolling engagement with said bottom and having imparted thereto by the fuel passing through said opening a turbulent or swirl action, and a cage confining the limits of the rolling of said element in opposite directions, said cage being connected with said base and having its lower end opening into said recess, said cage being closed at its top and of frusto-conoidal contour, said cage being formed with a pair of diametrically opposed openings.

6. In a gas controlling device for the purpose set forth, a base plate having a recess in one face, said recess having its bottom inclined to the horizontal, said base plate formed with an opening extending through said bottom, a spherical body mounted on said bottom for rolling contact therewith and acting for varying the area of said opening, and means secured to and for loosely confining said body on said base plate.

7. In a gas controlling device, a base plate formed in one face with a recess, said base plate being provided with an opening extending through the bottom of the recess, a globular element in rolling contact with said bottom and providing for varying the area of said opening, and a cage connected to the base plate for loosely confining said element in said recess, said cage communicating with said opening and being formed in its body with diametrically opposed openings.

DAVID PAUL.